…

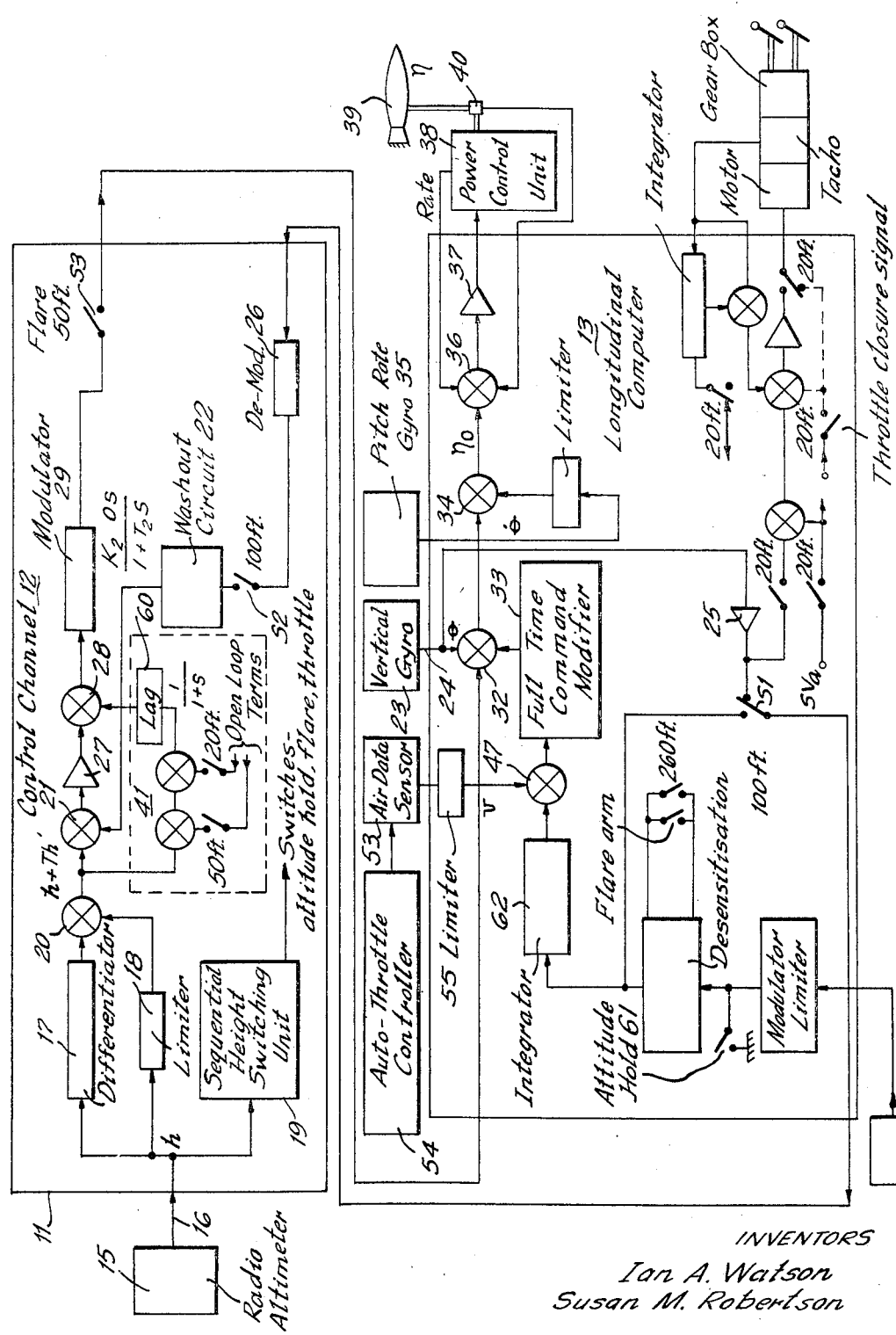

United States Patent Office 3,489,378
Patented Jan. 13, 1970

3,489,378
CONTROL OF AIRCRAFT
Ian A. Watson and Susan M. Robertson, both of Century Works, Lewisham, London SE. 13, England
Filed Jan. 30, 1967, Ser. No. 612,536
Claims priority, application Great Britain, Jan. 29, 1966, 4,059/66
Int. Cl. B64c *13/50*
U.S. Cl. 244—77                                      7 Claims

ABSTRACT OF THE DISCLOSURE

The pitch control demand signal of an automatic landing system is modified, at altitudes below 100 feet, by a signal indicative of deviation of aircraft airspeed from an ideal airspeed. By controlling the aircraft in pitch in response to airspeed error, the ideal landing flight path may be adhered to more closely.

---

The invention relates to the control of aircraft.

The present invention provides an automatic flight control system comprising a control channel for producing a control signal to control the speed of the aircraft preparatory to landing at least over the flare phase thereof wherein the system comprises means to produce a signal (hereinafter called the modifying signal) for modifying the control signal to take account of the error, if any, in the airspeed of the aircraft.

According to one aspect of the invention apparatus arranged to produce a control signal capable of being utilised to control the flight path of an aircraft includes means arranged to incorporate a signal representative of airspeed error or a function of airspeed error in said control signal.

Said means may incorporate a device, i.e. switching means, operable in response to the height of the aircraft in such manner that the signal representative of airspeed error is incorporated only during the flare phase of landing of the aircraft.

Said means may incorporate limiting means arranged to limit the signal representative of airspeed error such that the amount of "nose down" and/or "nose up" action demanded is limited by a predetermined amount.

The limiting means may be provided by a single arrangement to cause the modifying signal to be limited in respect of both "nose down" and "nose up" effect, which is arranged to have a non-linear limiting characteristic such that a greater "nose down" effect than "nose up" effect is permitted.

The apparatus may include a further limiting device arranged to limit the signal passed thereto such that the rate of change of pitch attitude demanded by the control signal in response to the modifying signal is not more than a predetermined maximum amount.

Said means may derive the signal representative of airspeed error from an air data sensor operatively linked with an automatic throttle controller.

The foregoing and further features of the invention will become apparent from the following description of a preferred embodiment thereof with reference to the accompanying drawing which is a block schematic representation of a monitored arrangement for controlling the elevators of an aircraft.

Referring now to the drawing the arrangement comprises a computer 11 consisting of a control channel 12, and a longitudinal computer 13.

A radio altimeter 15 has an output connected via lead 16 to the inputs of a differentiator 17, a limiter 18 and a sequential height switching unit 19. The outputs from differentiator 17 and limiter 18 are fed as inputs to a summing point 20 whose output is connected as an input to a further summing point 21.

A further input to the summing point 21 is connected from the output of a washout circuit 22. The input to washout circuit 22 is derived from a vertical gyroscope 23 via lead 24, amplifier 25, switch S1, demodulator 26 and switch S2.

The output of summing point 21 is connected via an amplifier 27 and a summing point 28 to the input of a modulator 29.

The output from the modulator 29 is connected to one side of a switch S3 and the other side of the switch S3 is connected through lead 59 as one input to a summing point 32 which derives further inputs from the vertical gyroscope 23 via lead 24 and from a full time command modifier 33. The input to the full time command modifier 33 is connected to the output of a summing point 47. An input to the summing point 47 is derived from an air data sensor 53, which is connected to a throttle controller 54, via a limiter 55.

The output from summing point 32 is fed as an input to a summing point 34 which derives a further input from a pitch rate gyroscope 35.

The output from summing point 34 is fed via a summing point 36 and an amplifier 37 to a power control unit 38 which is mechanically linked to control the position of elevators 39 (one only shown). Feedback circuits are provided from the power control unit 38 and from a pickoff 40, associated with the mechanical linkage to elevators 39, the feedback circuits being connected to provide further inputs to the summing point 36.

Arrangement 41 in control channel 12 which derives an input from the output of summing point 20 and provides a further input for summing point 28 provides predetermined pitch up signals at predetermined altitudes of an aircraft carrying the apparatus under control of the sequential height switching unit 19. Such an arrangement is more fully disclosed and described in application Ser. No. 404,583, filed Oct. 19, 1964, now abandoned.

In operation signals representative of the altitude of the aircraft are fed from the radio altimeter 15 via the lead 16 to a differentiator 17 whose output signal plus the output from limiter 18 below the limiting height is representative of a height rate demand proportional to height below 50 feet. This height rate demand signal is fed as an input to summing point 21 where it is augmented with a signal representative of washed out pitch attitude from washout circuit 22. The output from washout circuit 22 is only provided when the aircraft is below 100 feet, this being arranged under control of sequential height switching unit 19 which causes switch S2 to change over from the position shown in the figure and switch S1 to change to the position shown when the aircraft reaches 100 feet during a landing manoeuvre.

When the aircraft reaches an altitude of 50 feet switch S3 is caused to change over from the positions shown in the drawing under control of sequential height switching unit 19. Hence the output signal from modulator 29 is fed to the summing point 32 where it augments a signal representative of pitch attitude derived from the vertical gyroscope 23 and a signal representative of stored pitch attitude at the end of the glide slope mode of operation and airspeed error limited by full time command modifier 33. The arrangement that provides the input representative of stored pitch attitude to full time command modifier 33 is disclosed in co-pending application Ser. No. 612,535, filed Jan. 30, 1967, and therefore this arrangement is not described herein.

A signal representative of airspeed error is derived from the air data sensor which is linked to the throttle controller 54. Such an arrangement is described in co-pending application Ser. No. 556,458, filed June 9, 1966. A suitable monitored air data sensor is also disclosed in Patent No. 3,126,736. The airspeed error signal is passed to the limiter 55 which is arranged to limit the signal according to the amount of "nose down" effect it would have on the aircraft. The limiter 55 may have a non-linear limiting characteristic so that in addition it serves to limit the signal, to a smaller extent, according to the amount of "nose up" effect it would have on the aircraft. The limited signal is added to the signal representative of stored glide slope at summing point 47 and passed to full time command modifier 33 which may be arranged to limit the combined signal before passing it to summing point 32. The full time command modifier 33 is arranged to inhibit passage of signals to summing point 32 above a predetermined height of the aircraft e.g. about 100 feet.

The output from summing point 32 is fed to the summing point 34 where a further signal representative of pitch rate derived from pitch rate gyroscope 35 is further added. The output from summing point 34 which comprises the elevator demand signal $n_D$ or control signal is fed via summing point 36 and amplifier 37 to activate power control unit 38 to control the position of elevators 39.

Although the arrangement is merely shown for controlling the elevators of an aircraft it should be appreciated that the control signal produced could alternatively, or in addition, be utilised for providing a display in a flight director system.

The advantages of the airspeed error signal connected in the above arrangement is that it reduces the loss of lift and consequent increase in vertical descent rate of an aircraft during the landing phase, due to loss of airspeed, which may be for instance caused by windshear, gusts, slow throttle response, or throttle closure during autoflare.

The present invention relates to modification of the control signal during the flare phase of landing (i.e. below 50 feet). Below 100 feet, the switch S1 is in the position shown so that the output of the washout circuit 22 is $$\frac{K_2 \theta S}{1+T_2 S}$$

the transfer function of the washout circuit 22 being of the general form $$\frac{S}{1+S}$$

as is conventional for this type of circuit. The signal output from summing point 20 is $h+T\dot{h}$ when $h$ is the height output of the radio altimeter 15, $\dot{h}$ is the first derivative of $h$, and T is a constant. The above two signals are combined at the summing point 21 to produce the output $$K_1 \left[ (h+T\dot{h}) + \frac{K_2 \theta S}{1+T_2 S} \right]$$

after suitable amplification, and to this signal is added the lagged form of the signal $h+T\dot{h}$ as obtained from the circuit 41. The circuit 41 includes a lag circuit 60 whose transfer function is of the general form $$\frac{1}{1+S}$$

as is conventional for this type of circuit. Thus, the combined signal output of the summing point 28 is of the form $$K_1 \left[ (h+T\dot{h}) + \frac{K_2 \theta S}{1+T_2 S} \right] + K_3 \frac{(h+T\dot{h})}{1+T_1 S}$$

which may be reduced to the form $$K_1(h+T\dot{h})\left(1+\frac{K_4}{1+T_1 S}\right)+\frac{K_5 \theta S}{1+T_2 S}$$

T, $T_1$, $T_2$ and $K_1$, $K_4$ and $K_5$ being constants.

At altitudes of less than 50 feet, the switch S3 closes to apply the above signal to the summing point 32 where the vertical gyro output signal $\theta$ and the output of the full time command modifier 33 are added thereto. The full time command modifier is entirely conventional and as stated before it passes signals only at altitudes of less than 100 feet, acting as a signal rate and amplitude limiter, and has as inputs the output of the limiter 55 and the output of the integrator 62. Prior to flare at 50 feet, the integrator 62 receives the glideslope signal $\beta$. At flare, the altitude hold switch 61 closes and thus grounds the glideslope signal so that, during flare, the datum signal previously stored in the integrator 62 is applied to the summing point 47.

The discussion of the various signals immediately preceding forms, per se, no part of the present invention. Rather, the present invention is concerned with the foregoing signals in combination with the additional signal applied to the summing point 47 and derived from the air data sensor 53. As discussed previously, the purpose of the additional signal at summing point 47 is to provide an additional input to the elevator demand signal $n_D$ in the event that aircraft speed varies from the ideal during the flare. If, for example, an error in airspeed occurs due to a wind gust, the elevator demand signal is altered to cause positive or negative pitch change tending to correct the airspeed error thus more closely to simulate the ideal flare path. The limiter 55 may, as described, impart a non-linear characteristic to the airspeed error signal. In any event, the invention is primarily concerned with the addition of this velocity error signal to the elevator control channel for the purpose of more closely following the desired flight path during the flare phase of landing. Thus, if the airspeed varies from the ideal and no compensation is made therefor, the aircraft will deviate substantially from the desired flare path, whereas with the present invention this same variation in airspeed from the ideal will cause a pitch change in either the "nose up" or the "nose down" direction, tending to maintain the aircraft on the desired landing flare flight path.

We claim:

1. In an automatic landing control system for aircraft of the type having a pitch attitude control channel including an actuator for controlling the aircraft in pitch, glide slope receiver means for producing an actuator control signal to cause the aircraft to follow an ideal landing flight path, means for applying said actuator control signal to said actuator below a first predetermined altitude of the aircraft, autoflare computer means for producing an autoflare control signal to cause the aircraft to follow an ideal autoflare landing path, means for applying said autoflare control signal to said actuator below a second predetermined altitude of the aircraft which is less than said first predetermined altitude, and an auto-throttle controller to control the airspeed of the aircraft to follow at all times an ideal airspeed during such ideal landing flight and ideal autoflare landing paths, the improvement comprising:
means for sensing variation of aircraft airspeed from said ideal airspeed and having an output signal indicative of such variation, and
means for adding such output signal to said actuator control signal to produce pitch attitude change in the aircraft in response to such variation tending to maintain the aircraft on said ideal ideal landing flight and ideal autoflare landing paths.

2. In the automatic landing control system according to claim 1 wherein the last-mentioned means includes a limiter for limiting the amplitude of said output signal.

3. In an automatic landing control system for aircraft of the type having a pitch attitude control channel including an actuator for controlling the aircraft in pitch, means for producing an actuator control signal to cause the aircraft in pitch to follow an ideal landing flight path, and an auto-throttle controller to control the airspeed of the aircraft to follow at all times an ideal airspeed during such landing flight path,
the improvement comprising:
means for sensing variation of aircraft airspeed from said ideal airspeed and having an output signal indicative of such variation, and
means for adding such output signal to said actuator control signal to produce pitch attitude change in the aircraft in response to such variation tending to maintain the aircraft on said ideal landing flight path, said last mentioned means including a limiter for limiting the amplitude of said output signal, said limiter being non-linear.

4. In the automatic landing control system according to claim 3 wherein said last-mentioned means includes mechanism for limiting the amplitude and rate of the limiter output.

5. In an automatic landing control system according to claim 4 wherein said system includes a glideslope receiver and an integrator connected to the output of said glideslope receiver, the outputs of said integrator and said limiter being applied as inputs to said mechanism.

6. In the automatic landing control system for aircraft of the type having a pitch attitude control channel including an actuator for controlling the aircraft in pitch, a vertical gyro having an output to said actuator, a pitch rate gyro having an output to said actuator, and an autothrottle controller for controlling the speed of the aircraft during its landing phase, the improvement comprising:
means for sensing variation of aircraft airspeed from ideal airspeed during the landing phase and having an output signal indicative of such variation, and
means for adding said output signal as an input to said actuator, and including an amplitude and rate limiting mechanism for passing said output signal only below a predetermined altitude.

7. In an automatic landing control system as defined in claim 6 including additional signal output means for said actuator, and mechanism for applying such additional output to said actuator only during the flare phase of landing, commencing at an altitude lower than said predetermined altitude.

References Cited

UNITED STATES PATENTS

| | | | |
|---|---|---|---|
| 2,875,965 | 3/1959 | Anderson et al. | 244—77 |
| 3,265,333 | 8/1966 | Montooth | 244—77 |
| 2,701,111 | 2/1955 | Schuck | 244—77 |
| 2,953,327 | 9/1960 | Clement et al. | 244—77 |
| 2,978,210 | 4/1961 | Larson | 244—77 |

FERGUS S. MIDDLETON, Primary Examiner

U.S. Cl. X.R.

343—108